US012626960B2

(12) United States Patent (10) Patent No.: US 12,626,960 B2
Yan et al. (45) Date of Patent: May 12, 2026

(54) SECONDARY BATTERY AND PREPARATION METHOD THEREOF, BATTERY MODULE, BATTERY PACK, AND ELECTRIC APPARATUS

(71) Applicant: CONTEMPORARY AMPEREX TECHNOLOGY (HONG KONG) LIMITED, Hong Kong (CN)

(72) Inventors: Qingwei Yan, Ningde (CN); Xiaobin Dong, Ningde (CN); Jiazheng Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 330 days.

(21) Appl. No.: 18/407,451

(22) Filed: Jan. 9, 2024

(65) Prior Publication Data

US 2024/0145791 A1 May 2, 2024

Related U.S. Application Data

(63) Continuation of application No. PCT/CN2022/092737, filed on May 13, 2022.

(51) Int. Cl.
H01M 10/42 (2006.01)
H01M 4/02 (2006.01)
(Continued)

(52) U.S. Cl.
CPC ..... H01M 10/4235 (2013.01); H01M 4/0402 (2013.01); H01M 4/139 (2013.01);
(Continued)

(58) Field of Classification Search
CPC ........... H01M 10/4235; H01M 4/0402; H01M 4/139; H01M 4/62; H01M 10/0525;
(Continued)

(56) References Cited

U.S. PATENT DOCUMENTS

2019/0393481 A1 12/2019 Fujioka

FOREIGN PATENT DOCUMENTS

CN 101894937 A 11/2010
CN 102055011 A 5/2011
(Continued)

OTHER PUBLICATIONS

Decision to Grant (with English Machine Translation), mailed Jul. 15, 2025, for corresponding Japanese Patent Application Serial No. 2024-501216.
The extended European search report received in the counterpart European application 22938727.9, mailed on Jan. 10, 2025.
Notice of Reasons for Refusal received in the counterpart Japanese application 2024-501216, mailed on Mar. 4, 2025.
(Continued)

*Primary Examiner* — Nicole M. Buie-Hatcher
*Assistant Examiner* — Taylor Harrison Krone
(74) *Attorney, Agent, or Firm* — K&L Gates LLP

(57) ABSTRACT

A secondary battery is provided, including a positive electrode plate and a negative electrode plate. The positive electrode plate includes a positive electrode current collector and a positive electrode film layer provided on two surfaces of the positive electrode current collector, the negative electrode plate includes a negative electrode current collector and a negative electrode film layer provided on two surfaces of the negative electrode current collector, and the negative electrode film layer includes a reaction zone opposite the positive electrode film layer and a non-reaction zone not opposite the positive electrode film layer, where a lithium supplement layer and a barrier layer are provided on the non-reaction zone. A preparation method of secondary battery, a battery module, a battery pack, and an electric apparatus are also provided.

15 Claims, 4 Drawing Sheets

(51) Int. Cl.

| | | |
|---|---|---|
| *H01M 4/04* | (2006.01) | |
| *H01M 4/139* | (2010.01) | |
| *H01M 4/62* | (2006.01) | |
| *H01M 10/0525* | (2010.01) | |

(52) U.S. Cl.
CPC ......... *H01M 4/62* (2013.01); *H01M 10/0525* (2013.01); *H01M 2004/021* (2013.01); *H01M 2004/027* (2013.01); *H01M 2220/20* (2013.01)

(58) Field of Classification Search
CPC ..... H01M 2004/021; H01M 2004/027; H01M 2220/20
See application file for complete search history.

(56)     References Cited

FOREIGN PATENT DOCUMENTS

| CN | 102082288 | A | | 6/2011 |
|---|---|---|---|---|
| CN | 113823849 | A | | 12/2021 |
| CN | 216084938 | U | | 3/2022 |
| JP | 2002075454 | A | * | 3/2002 |

OTHER PUBLICATIONS

International Search Report received in the corresponding international application PCT/CN2022/092737, mailed on Jan. 20, 2023.
Office Action (with English Machine Translation), mailed Nov. 3, 2025, for corresponding Korean Patent Application Serial No. 10-2024-7000758.

* cited by examiner

——— Negative electrode plate
·········· Separator
═══ Positive electrode plate
——— Lithium supplement layer
·········· Barrier layer

5

SECONDARY BATTERY AND PREPARATION METHOD THEREOF, BATTERY MODULE, BATTERY PACK, AND ELECTRIC APPARATUS

CROSS REFERENCE TO RELATED MATTER

This application is a continuation of international application PCT/CN2022/092737, filed May 13, 2022 and entitled "SECONDARY BATTERY AND PREPARATION METHOD THEREOF, BATTERY MODULE, BATTERY PACK, AND ELECTRIC APPARATUS", the entire content of which is hereby incorporated by reference in its entirety.

TECHNICAL FIELD

This application relates to the field of lithium battery technologies, and in particular, to a secondary battery and a preparation method thereof, a battery module, a battery pack, and an electric apparatus.

BACKGROUND

In recent years, with increasingly wide use of lithium-ion batteries, lithium-ion batteries have been widely used in energy storage power supply systems such as hydroelectric, thermal, wind, and solar power plants, and many other fields including electric tools, electric bicycles, electric motorcycles, electric vehicles, military equipment, and aerospace. Along with the great development of lithium-ion batteries, higher requirements are imposed on their energy density, cycling performance, safety performance, and the like.

When the battery starts charging, lithium ions from the positive electrode plate preferentially intercalate into the reaction zone of the negative electrode plate, causing a decrease in the potential of the reaction zone and creating a voltage difference with the non-reaction zone. The lithium ions in the reaction zone diffuse and intercalate into the non-reaction zone at a slow speed, while the lithium ions intercalated in the non-reaction zone can hardly return to the positive electrode plate during the discharge process. This results in irreversible lithium loss in the positive electrode plate, deteriorating the initial coulombic efficiency, cycling performance, and storage performance of the battery cell. Therefore, existing lithium-ion batteries still need to be improved in terms of initial coulombic efficiency, cycling performance, and storage performance.

SUMMARY

This application has been made in view of the foregoing issues. An objective of this application is to provide a secondary battery which has improved initial coulombic efficiency, cycling performance, and storage performance.

To achieve the foregoing objective, this application provides a secondary battery and a preparation method thereof, a battery module, a battery pack, and an electric apparatus.

A first aspect of this application provides a secondary battery including a positive electrode plate and a negative electrode plate, where the positive electrode plate includes a positive electrode current collector and a positive electrode film layer provided on two surfaces of the positive electrode current collector, the negative electrode plate includes a negative electrode current collector and a negative electrode film layer provided on two surfaces of the negative electrode current collector, and the negative electrode film layer includes a reaction zone opposite the positive electrode film layer and a non-reaction zone not opposite the positive electrode film layer, where a lithium supplement layer and a barrier layer are provided on the non-reaction zone.

In this application, a lithium supplement layer and a barrier layer are provided on the non-reaction zone of the negative electrode plate. The lithium supplement layer effectively prevents the lithium ions in the reaction zone from diffusing and intercalating into the non-reaction zone, while the lithium in the lithium supplement layer diffuses toward the reaction zone at a slow speed during the discharge process of the battery cell. The barrier layer fully isolates the non-reaction zone outside the lithium supplement layer, and the electrolyte cannot infiltrate the non-reaction zone, blocking the path of diffusion of lithium in the reaction zone and the lithium supplement layer to the non-reaction zone. This reduces the loss of the lithium source and further improves the initial coulombic efficiency, cycling performance, and storage performance of the secondary battery.

In any embodiment, the lithium supplement layer is provided at an end of the non-reaction zone closer to the reaction zone, and the barrier layer is provided starting from the lithium supplement layer and extending away from the reaction zone. Thus, the lithium supplement efficiency can be improved without affecting the production capacity.

In any embodiment, the distance between the side of the lithium supplement layer closer to the reaction zone and the reaction zone is 2 mm to 5 mm. When the distance between the side of the lithium supplement layer closer to the reaction zone and the reaction zone is in the specified range, the initial coulombic efficiency and cycling performance of the secondary battery can be further improved.

In any embodiment, the lithium supplement layer includes a substance capable of providing active lithium; optionally includes one or more of lithium metal foil, lithium powder, and lithium alloy; and further optionally includes one or more of lithium metal foil, lithium powder, lithium silicon alloy, lithium aluminum alloy, lithium magnesium alloy, and lithium tin alloy.

In any embodiment, the theoretical capacity of lithium in the lithium supplement layer $C_{Li}$ satisfies 20% $C_1 \leq C_{Li} \leq 120\% C_1$, optionally 90% $C_1 \leq C_{Li} \leq 120\% C_1$, where $C_1$ is the capacity of the negative electrode film layer corresponding to the lithium supplement layer. When the theoretical capacity $C_{Li}$ of lithium in the lithium supplement layer satisfies the given condition, the initial coulombic efficiency, cycling performance, and storage performance of the secondary battery can be improved without affecting the safety performance of the secondary battery.

In any embodiment, the barrier layer is selected from a film or coating incapable of being infiltrated by electrolyte, where the film includes one or more of polypropylene, polyethylene, polyester fiber, and polyvinyl chloride, optionally includes one or more of cast polypropylene, uniaxially oriented polypropylene, biaxially oriented polypropylene, polyethylene, polyester fiber, and polyvinyl chloride, and further optionally includes polyethylene; and the coating includes one or more of polyvinylidene fluoride, polytetrafluoroethylene, polyimide, polyimide, polymethyl methacrylate, polyurethane, polystyrene, polyacrylic acid, polyacrylamide, polyacrylonitrile, and a copolymer thereof.

In any embodiment, thickness of the barrier layer is 6 μm to 40 μm, optionally 10 μm to 20 μm. When the thickness of the barrier layer is within the given range, it can be ensured that the electrode plate is fully compatible with the battery cell without large deformation.

In any embodiment, the film is adhesive and has an adhesion of greater than 20 N/m. When the adhesion of the film is within the given range, the film can be effectively attached to the surface of the non-reaction zone.

In any embodiment, a spacing zone is provided along a width direction of the negative electrode plate at a side of the lithium supplement layer on the negative electrode plate away from the reaction zone, and the barrier layer is provided starting from the spacing zone and extending away from the reaction zone. When the spacing zone is provided at the side of the lithium supplement layer away from the reaction zone on the negative electrode plate, the initial coulombic efficiency, cycling performance, and storage performance of the secondary battery can be further improved.

In any embodiment, width of the spacing zone is 5 mm to 50 mm, optionally 10 mm to 15 mm. When the width of the spacing zone is within the given range, this better facilitates provision of the barrier layer and more effectively isolates the electrolyte without affecting the processing of the electrode plate.

In any embodiment, depth of the spacing zone is equal to thickness of the negative electrode film layer. When the depth of the spacing zone is equal to the thickness of the negative electrode film layer, the electrolyte is prevented from infiltrating into the non-reaction zone along the negative electrode film layer at the bottom, so that the lithium ions are prevented from diffusing into the non-reaction zone, thus improving the initial coulombic efficiency, cycling performance, and storage performance of the secondary battery.

A second aspect of this application further provides a preparation method of secondary battery. The method includes the following steps:

(1) preparing a positive electrode plate;
    (2) preparing a negative electrode plate;
    (3) preparing a separator;
    (4) preparing an electrolyte; and
    (5) preparing a secondary battery;
    where step (2) includes a step of providing a lithium supplement layer and a barrier layer on the negative electrode plate; and
    the secondary battery includes a positive electrode plate and a negative electrode plate, where the positive electrode plate includes a positive electrode current collector and a positive electrode film layer provided on two surfaces of the positive electrode current collector, the negative electrode plate includes a negative electrode current collector and a negative electrode film layer provided on two surfaces of the negative electrode current collector, and the negative electrode film layer includes a reaction zone opposite the positive electrode film layer and a non-reaction zone not opposite the positive electrode film layer, where a lithium supplement layer and a barrier layer are provided on the non-reaction zone.

In any embodiment, the barrier layer is provided through a coating or adhesive process; and optionally, the barrier layer is provided through an adhesive process.

A third aspect of this application provides a battery module including the secondary battery in the first aspect of this application or a secondary battery prepared using the method in the second aspect of this application.

A fourth aspect of this application provides a battery pack including the battery module in the third aspect of this application.

A fifth aspect of this application provides an electric apparatus including at least one of the secondary battery in the first aspect of this application or a secondary battery prepared using the method in the second aspect of this application, the battery module in the third aspect of this application, or the battery pack in the fourth aspect of this application.

The battery module, battery pack, and electric apparatus in this application include the secondary battery provided in this application, and therefore have at least advantages that are the same as those of the secondary battery.

DESCRIPTION OF REFERENCE SIGNS

Figure 1:
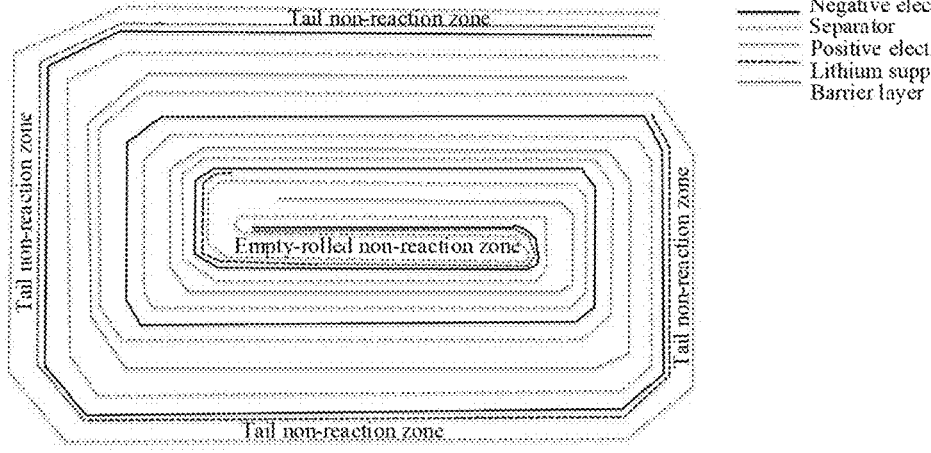
FIG. 1 is a schematic structural diagram of a wound battery cell of a secondary battery according to an embodiment of this application.

1. battery pack; 2. upper box body; 3. lower box body; 4. battery module; 5. secondary battery; 51. housing; 52. electrode assembly; and 53. top cover assembly.

DESCRIPTION OF EMBODIMENTS

The following specifically discloses in detail embodiments of the secondary battery and preparation method thereof, battery module, battery pack, and electric apparatus of this application, with appropriate reference to the accompanying drawings. However, there may be cases where unnecessary detailed descriptions are omitted. For example, detailed descriptions of well-known matters and repeated descriptions of actually identical structures have been omitted. This is to avoid unnecessarily prolonging the following description, for ease of understanding by persons skilled in the art. In addition, the accompanying drawings and the following descriptions are provided for persons skilled in the art to fully understand this application and are not intended to limit the subject matter recorded in the claims.

"Ranges" disclosed in this application are defined in the form of lower and upper limits A given range is defined by one lower limit and one upper limit selected, where the selected lower and upper limits define boundaries of that particular range. Ranges defined in this method may or may not include end values, and any combinations may be used, meaning any lower limit may be combined with any upper limit to form a range. For example, if ranges of 60-120 and 80-110 are provided for a specific parameter, it is understood that ranges of 60-110 and 80-120 can also be envisioned. In addition, if minimum limit values of a range are given as 1 and 2, and maximum limit values of the range are given as 3, 4, and 5, the following ranges can all be envisioned: 1-3, 1-4, 1-5, 2-3, 2-4, and 2-5. In this application, unless otherwise stated, a value range of "a-b" is a short representation of any combination of real numbers between a and b, where both a and b are real numbers. For example, a value range of "0 to 5" means that all real numbers from "0 to 5" are listed herein, and "0 to 5" is just an abbreviated representation of a combination of these values. In addition, a parameter expressed as an integer greater than or equal to 2 is equivalent to disclosure that the parameter is, for example, an integer among 2, 3, 4, 5, 6, 7, 8, 9, 10, 11, 12, and the like.

Unless otherwise specified, all the embodiments and optional embodiments of this application can be combined with each other to form new technical solutions.

Unless otherwise specified, all the technical features and optional technical features of this application can be combined with each other to form new technical solutions.

Unless otherwise specified, all the steps in this application can be performed in the order described or in random order, preferably, in the order described. For example, a method including steps (a) and (b) indicates that the method may include steps (a) and (b) performed in order or may include steps (b) and (a) performed in order. For example, that the method may further include step (c) indicates that step (c) may be added to the method in any sequence. For example, the method may include steps (a), (b), and (c), or steps (a), (c), and (b), or steps (c), (a), and (b), or the like.

Unless otherwise specified, "include" and "contain" mentioned in this application are inclusive or may be exclusive. For example, the terms "include" and "contain" can mean that other unlisted components may also be included or contained, or only listed components are included or contained.

Unless otherwise specified, in this application, the term "or" is inclusive. For example, the phrase "A or B" means "A, B, or both A and B". More specifically, any one of the following conditions satisfies the condition "A or B": A is true (or present) and B is false (or not present); A is false (or not present) and B is true (or present); or both A and B are true (or present).

In a wound or laminated battery cell, since the negative electrode plate must cover the entire positive electrode plate, the negative electrode plate includes a reaction zone opposite the positive electrode plate and a non-reaction zone not opposite the positive electrode plate. When the battery starts charging, lithium ions from the positive electrode plate preferentially intercalate into the reaction zone of the negative electrode plate, causing a decrease in the potential of the reaction zone of the negative electrode plate and creating a voltage difference with the non-reaction zone. Driven by this voltage difference, lithium ions in the reaction zone diffuse and intercalate into the non-reaction zone at a slow speed. The lithium ions intercalated into the non-reaction zone can hardly return to the positive electrode plate during the discharge process. This results in irreversible lithium loss in the positive electrode plate, and finally leads to the deterioration of the initial coulombic efficiency, cycling performance, and storage performance of the battery cell.

In this application, with the lithium supplement layer provided in the non-reaction zone of the negative electrode plate, the initial coulombic efficiency, cycling performance, and storage performance of the secondary battery can be improved. With the barrier layer provided in the non-reaction zone of the negative electrode plate, penetration by the electrolyte is prevented, and the path of diffusion of lithium ions from the lithium supplement layer and the reaction zone to the non-reaction zone is blocked. This enhances the lithium supplement efficiency and further improves the initial coulombic efficiency, cycling performance, and storage performance of the secondary battery.

[Secondary Battery]

In an embodiment of this application, this application provides a secondary battery including a positive electrode plate and a negative electrode plate. The positive electrode plate includes a positive electrode current collector and a positive electrode film layer provided on two surfaces of the positive electrode current collector, the negative electrode plate includes a negative electrode current collector and a negative electrode film layer provided on two surfaces of the negative electrode current collector, and the negative electrode film layer includes a reaction zone opposite the positive electrode film layer and a non-reaction zone not opposite the positive electrode film layer, where a lithium supplement layer and a barrier layer are provided on the non-reaction zone.

Although the mechanism is not clear, the inventors of this application have accidentally found that with the lithium supplement layer and the barrier layer provided on the non-reaction zone of the negative electrode plate in this application, the lithium supplement layer effectively prevents the lithium ions in the reaction zone from diffusing and intercalating into the non-reaction zone, while the lithium ions in the lithium supplement layer diffuse toward the reaction zone at a slow speed during the discharge process of the battery cell. The barrier layer fully isolates the non-reaction zone outside the lithium supplement layer, and the electrolyte cannot infiltrate the non-reaction zone, blocking the path of diffusion of lithium ions in the reaction zone and the lithium supplement layer to the non-reaction zone. This reduces the loss of the lithium source and further improves the initial coulombic efficiency, cycling performance, and storage performance of the secondary battery.

In the embodiment of this application, the secondary battery further includes a separator. A positive electrode plate, a negative electrode plate, and a separator are made into a battery cell through a winding or lamination process.

The two surfaces of the negative electrode plate are marked as side A and side B. In the wound battery cell, as shown in FIG. 1, since the negative electrode plate must cover the entire positive electrode plate, a non-reaction zone is formed by empty-rolling the center area by one or more turns, which is defined as a side-A empty-rolled non-reaction zone in this application. Similarly, to meet the requirement that the negative electrode plate must cover the entire positive electrode plate, one or more turns of non-reaction zone are provided on the outer side of the negative electrode plate in the tail area, which is defined as a side-B tail non-reaction zone in this application.

Figure 2:
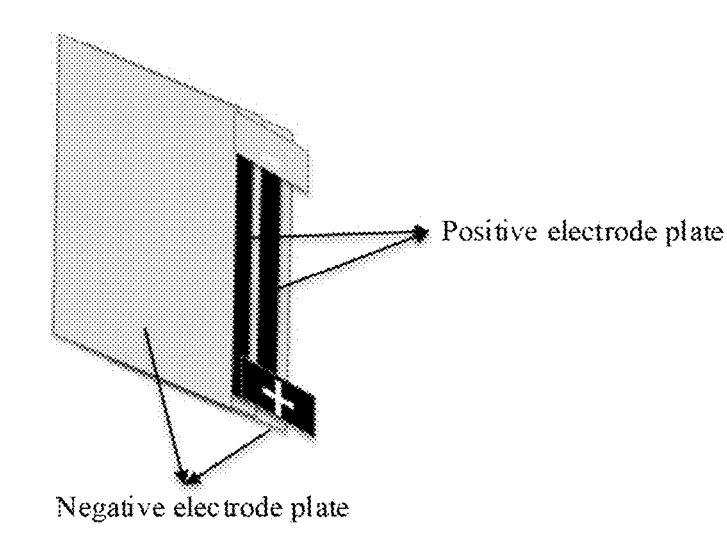
FIG. 2 is a schematic structural diagram of a laminated battery cell of a secondary battery according to an embodiment of this application.

As shown in FIG. 2, in a laminated battery cell, the outermost layer of the negative electrode plate is the non-reaction zone.

Figure 3:
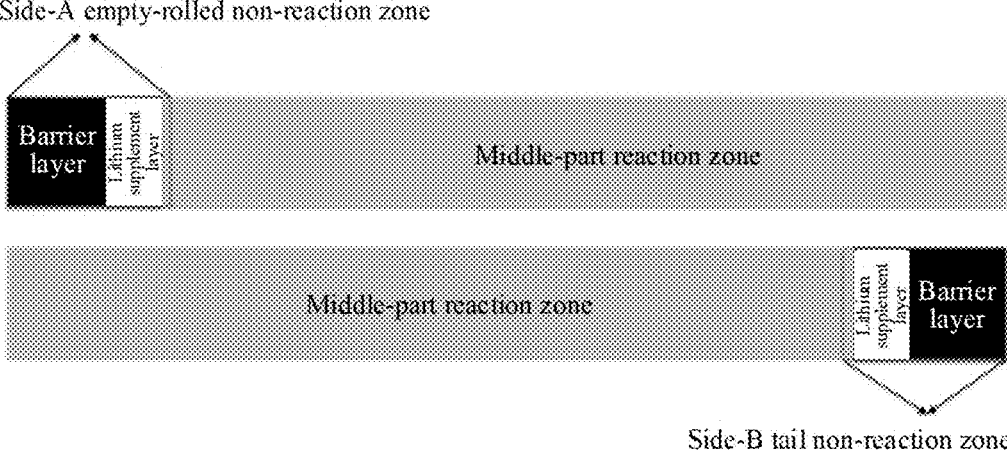
FIG. 3 is a schematic diagram of an unfolded negative electrode plate of the wound battery cell of the secondary battery according to the embodiment of this application shown in FIG. 1.

FIG. 3 is a schematic diagram of an unfolded negative electrode plate of the wound battery cell shown in FIG. 1. As shown in FIG. 1 and FIG. 3, a lithium supplement layer and a barrier layer are provided in the side-A empty-rolled non-reaction zone and side-B tail non-reaction zone, respectively.

For a battery cell produced by lamination, there is no non-reaction zone in the center, and the non-reaction zone is present only in the outermost layer; while for a battery cell produced by winding, the non-reaction zone is present in both the center and the tail. More non-reaction zones better facilitate the distribution of the lithium supplement layer. Therefore, optionally the battery cell is a wound battery cell.

Figure 4:
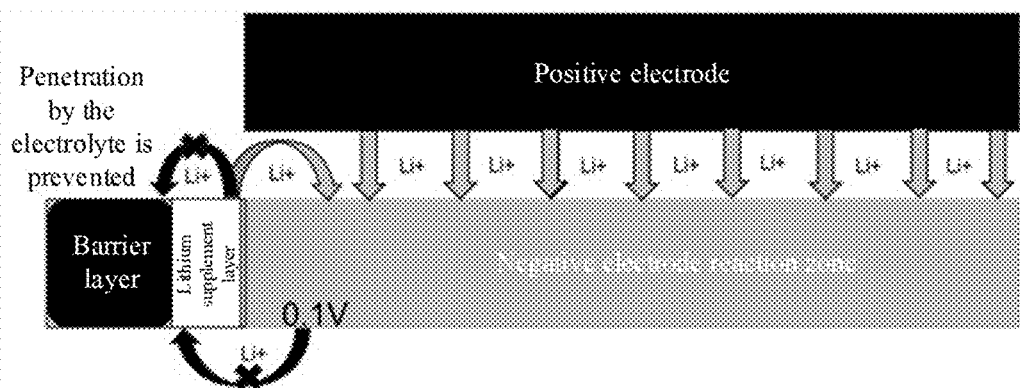
FIG. 4 is a schematic structural diagram of a battery cell of a secondary battery according to an embodiment of this application.

FIG. 4 is a schematic structural diagram of a secondary battery according to an embodiment of this application. As shown in FIG. 4, a lithium source is disposed on the surface of the negative electrode film layer in the non-reaction zone before electrolyte injection to form a lithium supplement layer in this application. The standard electrode potential of lithium with respect to hydrogen is −3.05 V, while the standard electrode potential of a non-lithium-intercalated negative electrode active material such as graphite or silicon-carbon materials with respect to hydrogen is around 0 V. Therefore, there is a voltage difference of approximately 3 V between lithium and the negative electrode active material such as graphite or silicon-carbon materials. After the battery cell is injected with electrolyte, the lithium source and the negative electrode film layer are in close contact, forming an electrical circuit. This is equivalent to a short circuit condition (in such a state, the lithium source acts as a negative electrode and the negative electrode film layer acts as a positive electrode). Under the effect of their voltage difference, lithium in the lithium source loses electrons and becomes free-moving lithium ions to intercalate into the negative electrode film layer, forming, for example, $LiC_x$ ($x \geq 6$) or/and $Li_xSi_y$ ($x > 0$, $y > 0$), and the like. In this case, the original lithium source, $LiC_x$, or/and $Li_xSi_y$ combine to form a new and stable lithium supplement layer. Due to the reduced potential of the lithium supplement layer, lithium ions in the reaction zone are effectively prevented from diffusing and intercalating into the non-reaction zone. Additionally, the lithium supplement layer maintains a relatively low potential, while the potential of the reaction zone of the negative electrode plate gradually increases during the discharge of the battery cell. At this time, the potential of the reaction zone is much higher than that of the non-reaction zone, and the lithium in the lithium supplement layer will be driven by this potential difference to diffuse into the reaction zone at a slow speed, thus improving the initial coulombic efficiency, cycling performance and storage performance of the secondary battery.

The lithium ions in the lithium supplement layer not only diffuse to the reaction zone under the effect of the voltage difference, but also intercalate into the non-reaction zone outside the lithium supplement layer under the effect of the voltage difference. In this application, a barrier layer is provided in the non-reaction zone so as to isolate the non-reaction zone outside the lithium supplement layer. The electrolyte cannot infiltrate the non-reaction zone, effectively blocking the diffusion path of lithium ions from the lithium supplement layer and the reaction zone to the non-reaction zone. This reduces the loss of the lithium source and further improves the initial coulombic efficiency, cycling performance, and storage performance of the secondary battery.

In some embodiments, the lithium supplement layer is provided at the end of the non-reaction zone closer to the reaction zone, and the barrier layer is provided starting from the edge of the lithium supplement layer and extending away from the reaction zone. If the lithium supplement layer is provided far from the reaction zone and is at the center area of the non-reaction zone, the relative diffusion path of lithium ions becomes longer, reducing the efficiency of lithium supplement. Additionally, the provision of the barrier layer becomes inconvenient, affecting production capacity.

In some embodiments, the distance between the side of the lithium supplement layer closer to the reaction zone and the reaction zone is 2 mm to 5 mm. The lithium supplement layer must be kept at a distance from the reaction zone to prevent a slight misalignment of the positive and negative electrode plates during the winding process from causing part of the lithium supplement layer to enter the reaction zone and leading to severe safety risks. Additionally, after the electrolyte injection, the lithium in the lithium supplement layer will diffuse outward around. If the lithium supplement layer is too close to the reaction zone, lithium over-intercalation may occur in the reaction zone close to the lithium supplement layer, leading to lithium precipitation and risks of battery short circuit. Maintaining a distance of at least 2 mm helps to avoid these risks. However, the distance should not be too far either, as this would increase consumption of the lithium source and reduce the effect of lithium supplement. The optimal distance is within 5 mm.

In some embodiments, the lithium supplement layer includes a substance capable of providing active lithium; optionally includes one or more of lithium metal foil, lithium powder, and lithium alloy; and further optionally includes one or more of lithium metal foil, lithium powder, lithium silicon alloy, lithium aluminum alloy, lithium magnesium alloy, and lithium tin alloy.

The gram capacity of lithium alloy is relatively low, and metal impurities will be formed after lithium releasing. The gram capacity of metallic lithium is high, and no impurity is generated after reactions. The processing performance of lithium foil in metallic lithium is superior to that of lithium powder. Therefore, optionally, the lithium supplement layer includes lithium metal foil.

In some embodiments, the theoretical capacity of lithium in the lithium supplement layer $C_{Li}$ satisfies 20% $C_1 \leq C_{Li} \leq 120\%$ $C_1$, optionally 90% $C_1 \leq C_{Li} \leq 120\%$ $C_1$, where $C_1$ is the capacity of the negative electrode film layer corresponding to the lithium supplement layer.

The ratio between the capacity of the lithium supplement layer and the capacity of the negative electrode film layer beneath the lithium supplement layer affects the effect of lithium supplement and the safety of the battery cell. When $C_{Li} \leq 20\%$ $C_1$, and $V_{Li} > V_{neg}$ ($V_{Li}$ is the potential of the lithium supplement layer, and $V_{neg}$ is the lithium intercalation platform voltage of the negative electrode plate), meaning that the potential of the lithium supplement layer is higher than the lithium intercalation platform voltage of the negative electrode plate. As a result, lithium in the lithium supplement layer cannot intercalate into the lithium intercalation region, and diffusion of the lithium in the lithium intercalation region to the lithium supplement layer cannot be prevented. When $C_{Li} > 120\%$ $C_1$, $V_{Li} < V_{neg}$ and ($V_{Li} \approx 0$ V). In this case, the potential of the lithium supplement layer is lower than the lithium intercalation platform voltage of the negative electrode plate, and lithium ions migrate towards the lithium intercalation region at a relatively fastest speed. Since $C_{Li}$ is far larger than $C_1$, a large amount of lithium cannot be intercalated into the negative electrode film layer but finally deposits on the surface of the negative electrode film layer. This leads to Vu remaining in the vicinity of 0 V for a long period. In such case, lithium in the lithium supplement layer migrates towards the lithium intercalation region in the form of lithium ions at the fastest speed for a long period. When the capacity of lithium migrated per unit time far exceeds the capacity decay of the negative electrode plate, local lithium precipitation occurs in the reaction zone of the negative electrode. Since the formation of the SEI film on the negative electrode plate requires the consumption of 6% to 10% of lithium, and the overall capacity of the negative electrode plate per unit area is 1.05 to 1.15 times the capacity of the positive electrode plate, when $C_{Li} \leq 120\%$ $C_1$, no lithium precipitation will occur in the reaction zone of the negative electrode plate. Therefore, when the capacity of lithium in the lithium supplement layer satisfies 20% $C_1 \leq C_{Li} \leq 120\%$ $C_1$, safe lithium supplement can be provided for the battery cell, and the initial coulombic efficiency, cycling performance, and storage performance of the secondary battery can be improved. Optionally, 90% $C_1 \leq C_{Li} \leq 120\%$ $C_1$.

In a wound battery cell, the lithium supplement layer can be provided in the side-A empty-rolled non-reaction zone and/or side-B tail non-reaction zone of the battery cell. $C_{Li} = C_A + C_B$, where $C_A$ represents the theoretical capacity of lithium in the lithium supplement layer provided in the side-A empty-rolled non-reaction zone of the battery cell, and $C_B$ represents the theoretical capacity of lithium in the lithium supplement layer provided in the side-B tail non-reaction zone of the battery cell. When 0% $C_{Li} \leq C_A \leq 100\%$ $C_{Li}$, 0% $C_{Li} \leq C_B \leq 100\%$ $C_{Li}$, and $C_A$ and $C_B$ are not both zero, the initial coulombic efficiency, cycling performance, and storage performance of the secondary battery can be further improved. Since the center of the battery cell has a relatively stronger capacity to retain electrolyte, which is more conducive to the diffusion of lithium ions from the lithium source, optionally, $C_A > C_B$.

Weight of the lithium supplement layer per unit area= (Coating weight of the negative electrode film layer×Weight ratio of the negative electrode active material×Gram capacity of the negative electrode active material)×($C_{Li}/C_1$)/Theoretical capacity of lithium in the lithium supplement layer. For example, if the lithium supplement layer is made of lithium foil, the coating weight of the negative electrode film layer is 9.4 mg/cm², the negative electrode active material is artificial graphite, and the weight ratio of the negative electrode active material in the negative electrode film layer is 96%, when $C_{Li} = 100\%$ $C_1$, then: weight of the lithium foil per unit area=(9.4×96%×360)×100%/3860=0.84 mg/cm², where the gram capacity of artificial graphite is 360 mAh/g, and the theoretical capacity of lithium metal is 3860 mAh/g. Different weights of the lithium supplement layer per unit area can be achieved using a calendering device.

In some embodiments, the barrier layer is selected from a film or coating incapable of being infiltrated by electrolyte, where the film includes one or more of polypropylene, polyethylene, polyester fiber, and polyvinyl chloride, optionally includes one or more of cast polypropylene, uniaxially oriented polypropylene, biaxially oriented polypropylene, polyethylene, polyester fiber, and polyvinyl chloride, and further optionally includes polyethylene; and the coating includes one or more of polyvinylidene fluoride, polytetrafluoroethylene, polyimide, polyimide, polymethyl methacrylate, polyurethane, polystyrene, polyacrylic acid, polyacrylamide, polyacrylonitrile, and a copolymer thereof.

Due to the odorless, non-toxic, stability within −90° C. to 100° C., resistance to acids and bases, resistance to organic solvents, low water absorption, and excellent electrical insulation properties of polyethylene (PE) films, the film optionally includes a PE film.

In some embodiments, the polyester fiber includes polyethylene terephthalate and polybutylene terephthalate.

In some embodiments, thickness of the barrier layer is 6 μm to 40 μm, optionally 10 μm to 20 μm.

In the embodiments of this application, the thickness of the barrier layer needs to be controlled. An excessively thin barrier layer is prone to breakage while an excessively thick barrier layer may lead to greater deformation of the electrode plate. When the thickness of the barrier layer is within the given range, it can be ensured that the electrode plate is fully compatible with the battery cell without large deformation.

In some embodiments, the film is adhesive and has an adhesion of greater than 20 N/m, optionally greater than 200 N/m, and further optionally greater than 400 N/m.

In the embodiments of this application, the film is adhesive. However, if the adhesion is excessively small, the film cannot be closely attached to the negative electrode film layer on the negative electrode plate and is prone to tearing. When the film has an adhesion of greater than 20 N/m, the film can be effectively attached to the surface of the non-reaction zone. Optionally, the film has an adhesion greater than the particle-to-particle cohesion in the negative electrode film layer. A film with single-sided adhesion or double-sided adhesion can satisfy this application as long as it can isolate the electrolyte. The film is optionally a film with single-sided adhesion because as compared to the film with single-sided adhesion, the increased thickness of the film with double-sided adhesion results in greater deformation of the electrode plate.

In some embodiments, a spacing zone is provided along a width direction of the negative electrode plate at a side of the lithium supplement layer on the negative electrode plate away from the reaction zone, and the barrier layer is provided starting from the spacing zone and extending away from the reaction zone. More specifically, the barrier layer is provided on the bottom surface of the spacing zone, on the side surface of the spacing zone closer to the non-reaction zone, and on the non-reaction zone far away from the reaction zone.

With the spacing zone provided at the side of the lithium supplement layer on the negative electrode plate away from the reaction zone, the injected electrolyte can be prevented from infiltrating into the non-reaction zone, so that the lithium ions in the lithium supplement layer and the reaction zone are prevented from diffusing into the non-reaction zone, thereby further improving the initial coulombic efficiency, cycling performance, and storage performance of the secondary battery.

In some embodiments, width of the spacing zone is 5 mm to 50 mm, optionally 10 mm to 15 mm.

An excessively large width of the spacing zone affects the processing performance of the electrode plate, and particularly, will lead to uneven compression of the electrode plate in the cold pressing stage. An excessively small width affects the subsequent film coating process in the non-reaction zone, resulting in untight film attaching and electrolyte penetration from the bottom. When the width of the spacing zone is within the given range, this better facilitates provision of the barrier layer and more effectively isolates the electrolyte without affecting the processing of the electrode plate.

In some embodiments, depth of the spacing zone is equal to thickness of the negative electrode film layer.

If the depth of the spacing zone is less than the thickness of the negative electrode film layer, meaning that the negative electrode film layer is provided at the bottom of the spacing zone, the injected electrolyte infiltrates into the non-reaction zone along the negative electrode film layer at the bottom, making it impossible to prevent the lithium ions in the lithium supplement layer and the reaction zone from diffusing into the non-reaction zone. Therefore, the depth of the spacing zone needs to be equal to the thickness of the negative electrode film layer, meaning that at the bottom of the spacing zone is the current collector of the negative electrode plate.

In an embodiment of this application, a preparation method of secondary battery is provided. The method includes the following steps:

(1) preparing a positive electrode plate;

(2) preparing a negative electrode plate;

(3) preparing a separator;

(4) preparing an electrolyte; and (5) preparing a secondary battery;

where step (2) includes a step of providing a lithium supplement layer and a barrier layer on the negative electrode plate; and the secondary battery includes a positive electrode plate and a negative electrode plate, where the positive electrode plate includes a positive electrode current collector and a positive electrode film layer provided on two surfaces of the positive electrode current collector, the negative electrode plate includes a negative electrode current collector and a negative electrode film layer provided on two surfaces of the negative electrode current collector, and the negative electrode film layer includes a reaction zone opposite the positive electrode film layer and a non-reaction zone not opposite the positive electrode film layer, where a lithium supplement layer and a barrier layer are provided on the non-reaction zone.

In some embodiments, the barrier layer is provided through a coating or adhesive process; and optionally, the barrier layer is provided through an adhesive process.

The barrier layer that prevents electrolyte infiltration is very important and can be provided through the coating or adhesive process. Since the coating process requires steps such as equipment stirring, coating, and baking, the process is more complex than the adhesive process, optionally, the barrier layer is provided through the adhesive process.

The lithium supplement layer can be provided by processes such as attaching, rolling, and coating.

In some embodiments, the method further includes providing a spacing zone along a width direction of the negative electrode plate at a side of the lithium supplement layer on the negative electrode plate away from the reaction zone, where the spacing zone is provided by washing using a solvent, polishing and grinding, or intermittent coating.

In addition, the following describes a secondary battery, a battery module, a battery pack, and an electric apparatus in this application with appropriate reference to the accompanying drawings.

Normally, the secondary battery includes a positive electrode plate, a negative electrode plate, an electrolyte, and a separator. In a charge and discharge process of the battery, active ions are intercalated and deintercalated between the positive electrode plate and the negative electrode plate. The electrolyte conducts ions between the positive electrode plate and the negative electrode plate. The separator is disposed between the positive electrode plate and the negative electrode plate to mainly prevent a short circuit between positive and negative electrodes and to allow the ions to pass through.

[Positive Electrode Plate]

The positive electrode plate includes a positive electrode current collector and a positive electrode film layer provided on at least one surface of the positive electrode current collector, and the positive electrode film layer includes a positive electrode active material.

For example, the positive electrode current collector includes two opposite surfaces in its thickness direction, and the positive electrode film layer is disposed on either or both of the two opposite surfaces of the positive electrode current collector.

In some embodiments, the positive electrode current collector may be a metal foil current collector or a composite current collector. For example, an aluminum foil may be used as the metal foil. The composite current collector may include a polymer material matrix and a metal layer formed on at least one surface of the polymer material matrix. The composite current collector may be formed by forming a metal material (aluminum, aluminum alloy, nickel, nickel alloy, titanium, titanium alloy, silver, silver alloy, or the like) on a polymer material matrix (for example, a matrix of polypropylene (PP), polyethylene terephthalate (PET), polybutylene terephthalate (PBT), polystyrene (PS), or polyethylene (PE)).

In some embodiments, the positive electrode active material may be a positive electrode active material for batteries well-known in the art. For example, the positive electrode active material may include at least one of the following materials: olivine-structured lithium-containing phosphate, lithium transition metal oxide, and respective modified compounds thereof. However, this application is not limited to such materials, and may alternatively use other conventional well-known materials that can be used as positive electrode active materials for batteries. One type of these positive electrode active materials may be used alone, or two or more of them may be used in combination. An example of the lithium transition metal oxide may include but is not limited to at least one of lithium cobalt oxide (for example, $LiCoO_2$), lithium nickel oxide (for example, $LiNiO_2$), lithium manganese oxide (for example, $LiMnO_2$ and $LiMn_2O_4$), lithium nickel cobalt oxide, lithium manganese cobalt oxide, lithium nickel manganese oxide, lithium nickel cobalt manganese oxide (for example, $LiNi_{1/3}CO_{1/3}Mn_{1/3}O_2$ (NCM333 for short), $LiNi_{0.5}Co_{0.2}Mn_{0.3}O_2$ (NCM523 for short), $LiNi_{0.5}Co_{0.25}Mn_{0.25}O_2$ (NCM211 for short), $LiNi_{0.6}Co_{0.2}Mn_{0.2}O_2$ (NCM622 for short), and $LiNi_{0.8}Co_{0.1}Mn_{0.1}O_2$ (NCM811 for short)), lithium nickel cobalt aluminum oxide (for example, $LiNi_{0.85}Co_{0.15}Al_{0.05}O_2$), and modified compounds thereof. Examples of the olivine-structured lithium-containing phosphate may include but are not limited to at least one of lithium iron phosphate (for example, $LiFePO_4$ (LFP for short)), a composite material of lithium iron phosphate and carbon, lithium manganese phosphate (for example, $LiMnPO_4$), composite materials of lithium manganese phosphate and carbon, lithium manganese iron phosphate, and composite materials of lithium manganese iron phosphate and carbon.

In some embodiments, the positive electrode film layer further optionally includes a binder. For example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylic resin.

In some embodiments, the positive electrode film layer further optionally includes a conductive agent. For example, the conductive agent may include at least one of superconducting carbon, acetylene black, carbon black, Ketjen black, carbon dots, carbon nanotubes, graphene, and carbon nanofiber.

In some embodiments, the positive electrode plate may be prepared in the following manner the foregoing constituents used for preparing the positive electrode plate, for example, the positive electrode active material, the conductive agent, the binder, and any other constituent, are dispersed in a solvent (for example, N-methylpyrrolidone) to form a positive electrode slurry; and the positive electrode slurry is applied onto the positive electrode current collector, followed by processes such as drying and cold pressing to obtain the positive electrode plate.

[Negative Electrode Plate]

The negative electrode plate includes a negative electrode current collector and a negative electrode film layer disposed on at least one surface of the negative electrode current collector, where the negative electrode film layer includes a negative electrode active material.

For example, the negative electrode current collector includes two opposite surfaces in its thickness direction, and the negative electrode film layer is disposed on either or both of the two opposite surfaces of the negative electrode current collector.

In some embodiments, the negative electrode current collector may be a metal foil current collector or a composite current collector. For example, a copper foil may be used as the metal foil. The composite current collector may include a polymer material matrix and a metal layer formed on at least one surface of the polymer material matrix. The composite current collector may be formed by forming a metal material (copper, copper alloy, nickel, nickel alloy, titanium, titanium alloy, silver, silver alloy, or the like) on a polymer material matrix (for example, a matrix of polypropylene (PP), polyethylene terephthalate (PET), polybutylene terephthalate (PBT), polystyrene (PS), or polyethylene (PE)).

In some embodiments, the negative electrode active material may be a well-known negative electrode active material used for a battery in the art. For example, the negative electrode active material may include at least one of the following materials: artificial graphite, natural graphite, soft carbon, hard carbon, a silicon-based material, a tin-based material, lithium titanate, and the like. The silicon-based material may be selected from at least one of elemental silicon, silicon-oxygen compound, silicon-carbon composite, silicon-nitrogen composite, and silicon alloy. The tin-based material may be selected from at least one of elemental tin, tin-oxygen compound, and tin alloy. However, this application is not limited to these materials, but may use other conventional materials that can be used as negative electrode active materials for batteries instead. One type of these negative electrode active materials may be used alone, or two or more of them may be used in combination.

In some embodiments, the negative electrode film layer further optionally includes a binder. The binder may be selected from at least one of styrene-butadiene rubber (SBR), polyacrylic acid (PAA), polyacrylic acid sodium (PAAS), polyacrylamide (PAM), polyvinyl alcohol (PVA), sodium alginate (SA), polymethacrylic acid (PMAA), and carboxymethyl chitosan (CMCS).

In some embodiments, the negative electrode film layer further optionally includes a conductive agent. The conductive agent may be selected from at least one of superconducting carbon, acetylene black, carbon black, Ketjen black, carbon dots, carbon nanotubes, graphene, and carbon nanofiber.

In some embodiments, the negative electrode film layer further optionally includes other additives such as a thickener (for example, sodium carboxymethyl cellulose (CMC-Na)).

In some embodiments, the negative electrode plate may be prepared in the following manner the constituents used for preparing a negative electrode plate, for example, the negative electrode active material, the conductive agent, the binder, and any other constituent, are dispersed in a solvent (for example, deionized water) to form a negative electrode slurry; and the negative electrode slurry is applied onto the negative electrode current collector, followed by processes such as drying and cold pressing to obtain the negative electrode plate.

[Electrolyte]

The electrolyte conducts ions between the positive electrode plate and the negative electrode plate. The electrolyte is not specifically limited to any particular type in this application, and may be selected based on needs. For example, the electrolyte may be in a liquid state, a gel state, or an all-solid state.

In some embodiments, the electrolyte is a liquid electrolyte. The liquid electrolyte includes an electrolytic salt and a solvent.

In some embodiments, the electrolytic salt may be selected from at least one of lithium hexafluorophosphate, lithium tetrafluoroborate, lithium perchlorate, lithium hexafluoroborate, lithium bis(fluorosulfonyl)imide, lithium bis-trifluoromethanesulfon imide, lithium trifluoromethanesulfonate, lithium difluorophosphate, lithium difluorooxalatoborate, lithium bisoxalatoborate, lithium difluorobisoxalate phosphate, and lithium tetrafluoro oxalate phosphate.

In some embodiments, the solvent may be selected from at least one of ethylene carbonate (ethylene carbonate), propylene carbonate (propylene carbonate), ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, methyl sulfonyl methane, ethyl methanesulfonate, and diethyl sulfone.

In some embodiments, the liquid electrolyte further optionally includes an additive. For example, the additive may include a negative electrode film-forming additive, a positive electrode film-forming additive, or may include an additive capable of improving some performance of the battery, for example, an additive for improving over-charge performance of the battery, an additive for improving high-temperature performance or low-temperature performance of the battery, and the like.

[Separator]

In some embodiments, the secondary battery further includes a separator. The separator is not limited to any particular type in this application, and may be any well-known porous separator with good chemical stability and mechanical stability.

In some embodiments, a material of the separator may be selected from at least one of glass fiber, non-woven fabric, polyethylene, polypropylene, and polyvinylidene fluoride. The separator may be a single-layer film or a multi-layer composite film, and is not particularly limited. When the separator is a multi-layer composite film, all layers may be made of same or different materials, which is not particularly limited.

In some embodiments, the positive electrode plate, the negative electrode plate, and the separator may be made into an electrode assembly (battery cell) through winding or lamination.

In some embodiments, the secondary battery may include an outer package. The outer package may be used for packaging the foregoing electrode assembly and electrolyte.

In some embodiments, the outer package of the secondary battery may be a hard shell, for example, a hard plastic shell, an aluminum shell, or a steel shell. The outer package of the secondary battery may alternatively be a soft pack, for example, a soft pouch. Material of the soft package may be plastic, which, for example, may be polypropylene, polybutylene terephthalate, and polybutylene succinate.

Figure 5:
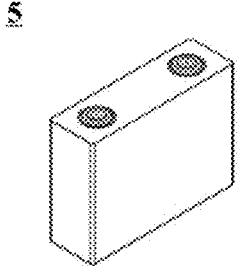
FIG. 5 is a schematic diagram of a secondary battery according to an embodiment of this application.

This application does not impose any special limitations on a shape of the secondary battery, and the secondary battery may be cylindrical, rectangular, or of any other shapes. For example, FIG. 5 shows a secondary battery 5 of a rectangular structure as an example.

Figure 6:
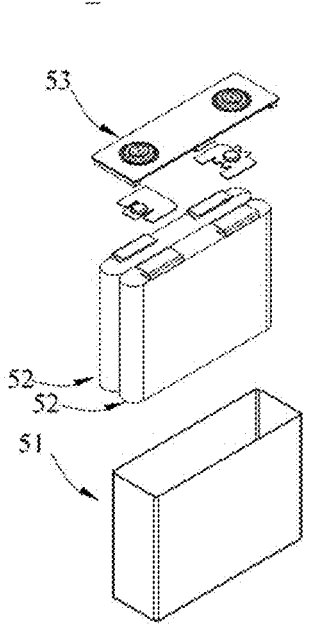
FIG. 6 is an exploded view of the secondary battery according to the embodiment of this application in FIG. 5.

In some embodiments, referring to FIG. 6, the outer package may include a housing 51 and a cover plate 53. The housing 51 may include a base plate and side plates connected to the base plate, where the base plate and the side plates enclose an accommodating cavity. The housing 51 has an opening communicating with the accommodating cavity, and the cover plate 53 can cover the opening to close the accommodating cavity. The positive electrode plate, the negative electrode plate, and the separator may be made into an electrode assembly 52 through winding or lamination. The electrode assembly 52 is packaged in the accommodating cavity. The electrolyte infiltrates the electrode assembly 52. There may be one or more electrode assemblies 52 in the secondary battery 5, and persons skilled in the art may make choices according to actual requirements.

In some embodiments, the secondary battery may be assembled into a battery module, and the battery module may include one or more secondary batteries. The specific quantity may be chosen by persons skilled in the art according to use and capacity of the battery module.

Figure 7:
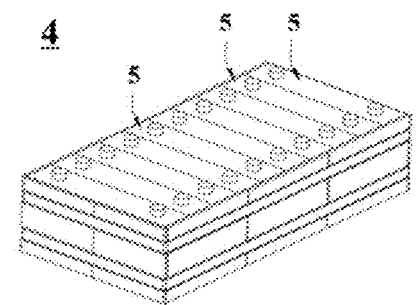
FIG. 7 is a schematic diagram of a battery module according to an embodiment of this application.

FIG. 7 shows a battery module 4 as an example. Referring to FIG. 7, in the battery module 4, a plurality of secondary batteries 5 may be sequentially arranged in a length direction of the battery module 4. Certainly, the batteries may alternatively be arranged in any other manners. Further, the plurality of secondary batteries 5 may be fastened by using fasteners.

Optionally, the battery module 4 may further include a housing with an accommodating space, and the plurality of secondary batteries 5 are accommodated in the accommodating space.

In some embodiments, the battery module may be further assembled into a battery pack, and the battery pack may include one or more battery modules. The specific quantity may be chosen by persons skilled in the art according to use and capacity of the battery pack.

Figure 8:
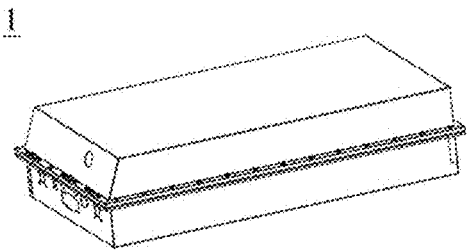
FIG. 8 is a schematic diagram of a battery pack according to an embodiment of this application.
Figure 9:
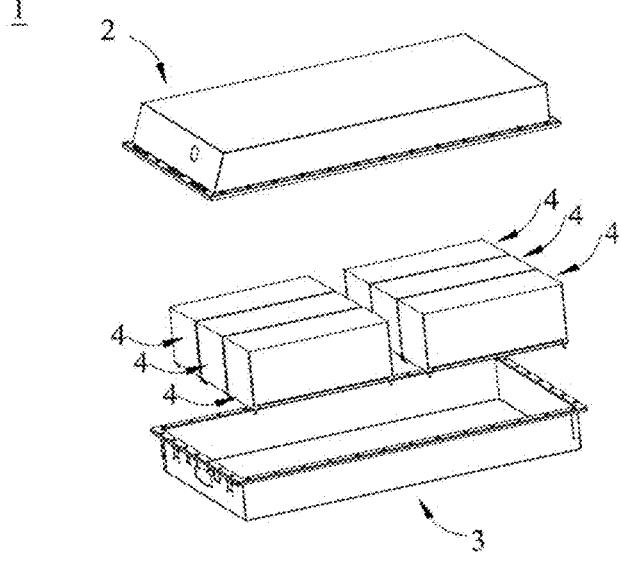
FIG. 9 is an exploded view of the battery pack according to an embodiment of this application in FIG. 8.

FIG. 8 and FIG. 9 show a battery pack 1 as an example. Referring to FIGS. 8 and 9, the battery pack 1 may include a battery box and a plurality of battery modules 4 arranged in the battery box. The battery box includes an upper box body 2 and a lower box body 3. The upper box body 2 can cover the lower box body 3 to form an enclosed space for accommodating the battery modules 4. The plurality of battery modules 4 may be arranged in the battery box in any manner.

In addition, this application further provides an electric apparatus. The electric apparatus includes at least one of the secondary battery, the battery module, or the battery pack provided in this application. The secondary battery, the battery module, or the battery pack may be used as a power source for the electric apparatus or an energy storage unit of the electric apparatus. The electric apparatus may include a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite system, an energy storage system, or the like, but is not limited thereto.

The secondary battery, the battery module, or the battery pack may be selected for the electric apparatus based on requirements for using the electric apparatus.

Figure 10:
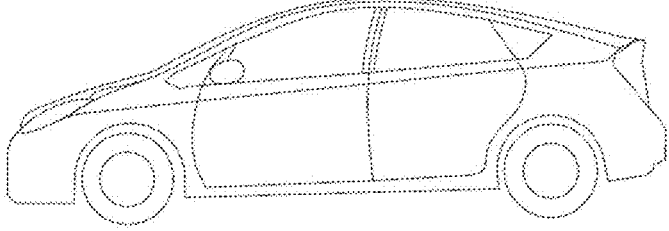
FIG. 10 is a schematic diagram of an electric apparatus using a secondary battery as a power source according to an embodiment of this application.

FIG. 10 shows an electric apparatus as an example. This electric apparatus is a battery electric vehicle, a hybrid electric vehicle, a plug-in hybrid electric vehicle, or the like. To satisfy a requirement of the electric apparatus for high power and high energy density of the secondary battery, a battery pack or a battery module may be used.

In another example, the apparatus may be a mobile phone, a tablet computer, a notebook computer, or the like. The apparatus usually requires to be light and thin, and may use a secondary battery as a power source.

EXAMPLES

The following describes examples of this application. The examples described below are illustrative and only used for explaining this application, and cannot be construed as limitations on this application. Examples whose technical solutions or conditions are not specified are made in accordance with technical solutions or conditions described in literature in the field or made in accordance with product instructions. The reagents or instruments used are all conventional products that are commercially available if no manufacturer is indicated.

Example 1

(1) Preparation of Positive Electrode Plate

The positive electrode active material lithium iron phosphate, conductive agent acetylene black, and binder polyvinylidene fluoride (PVDF) were mixed in a mass ratio of 96:2:2, and the solvent N-methylpyrrolidone (NMP) was added. The mixture was stirred by a vacuum stirrer to a uniform system, thus obtaining a positive electrode slurry. The positive electrode slurry was evenly applied on two surfaces of the positive electrode current collector aluminum foil with a thickness of 12 μm. The product was dried at 115° C. for 15 min. Cold pressing was performed to obtain a positive electrode film layer with a single-side thickness of 84 μm, and slitting was performed to obtain a positive electrode plate with a length of 605 mm and a film width of 88 mm. The coating weight was 20 mg/cm$^2$ and the compacted density was 2.4 g/cm$^3$.

(2) Preparation of Negative Electrode Plate

The negative electrode active material artificial graphite, conductive agent acetylene black, thickener sodium carboxymethyl cellulose (CMC-Na), and binder SBR were mixed in a mass ratio of 96.4:1:1.2:1.4, and the solvent deionized water was added. The mixture was stirred by a vacuum stirrer to a uniform system, thus obtaining a negative electrode slurry. The negative electrode slurry was evenly applied on two surfaces of the negative electrode current collector copper foil with a thickness of 8 μm. The product was dried at 115° C. for 15 min. Cold pressing was performed to obtain a negative electrode film layer with a single-side thickness of 61 μm, and slitting was performed to obtain a negative electrode plate with a length of 735 mm and a film width of 93 mm. The coating weight of the negative electrode plate was 9.4 mg/cm$^2$ and the compacted density was 1.55 g/cm$^3$. Lithium foils with the same specification were attached to the empty-rolled non-reaction zone and tail non-reaction zone of the negative electrode plate, where the theoretical capacity of lithium $C_{Li}$ in the lithium foil and the capacity $C_1$ of the corresponding negative electrode film layer below satisfied $C_{Li}$=100% $C_1$. The distance between the side of the lithium foil closer to the reaction zone and the reaction zone was 3 mm A polyethylene film with single-sided adhesion was attached as a barrier layer, starting from the lithium supplement layer and extending away from the reaction zone, where adhesion of the polyethylene film was 470 N/m and thickness was 20 μm.

(3) Preparation of Electrolyte

Ethylene carbonate (EC), ethyl methyl carbonate (EMC), and diethyl carbonate (DEC) were mixed in a mass ratio of 1:1:1 to obtain an organic solvent. Fully dried electrolyte salt LiPF$_6$ was dissolved in the organic solvent, with a concentration of the electrolyte salt being 1 mol/L. The solution was well mixed to obtain the electrolyte.

(4) Preparation of Separator

A 12 μm-thick polyethylene film was selected as the separator.

(5) Preparation of Secondary Battery

The positive electrode plate, the separator, and the negative electrode plate were sequentially stacked so that the separator was located between the positive electrode plate and the negative electrode plate to provide separation. Then the resulting stack was wound to obtain a bare battery cell. The bare battery cell was placed into an outer package and dried. Then electrolyte was injected according to the injection factor of 4.2 g/Ah, and processes such as vacuum sealing, standing, formation, and shaping were performed to obtain a secondary battery with a capacity of about 3 Ah.

Example 2

The preparation of the secondary battery was similar to that in Example 1. The difference was in that during preparation of the negative electrode plate, lithium aluminum alloy was attached to the empty-rolled non-reaction zone and tail non-reaction zone of the negative electrode plate, where the lithium releasing gram capacity was 1980 mAh/g.

Examples 3 to 6

The preparation of the secondary battery was similar to that in Example 1. The difference was in that during preparation of the negative electrode plate, the distances between the side of the lithium foil closer to the reaction zone and the reaction zone were 0 mm, 1 mm, 2 mm, 5 mm, and 6 mm, respectively.

Examples 7 to 11

The preparation of the secondary battery was similar to that in Example 1. The difference was in that during preparation of the negative electrode plate, lithium foils with the same specification were attached to the empty-rolled non-reaction zone and tail non-reaction zone of the negative electrode plate, where the theoretical capacity of lithium $C_{Li}$ in the lithium foils and the capacity $C_1$ of the corresponding negative electrode film layer below satisfied $C_{Li}$=10% $C_1$, $C_{Li}$=20% $C_{Li}$=90% $C_1$, $C_{Li}$=120% $C_1$, and $C_{Li}$=130% $C_1$, respectively.

Examples 12 and 13

The preparation of the secondary battery was similar to that in Example 1. The difference was in that the thicknesses of the polyethylene films were 6 μm and 40 μm, respectively.

Examples 14 and 15

The preparation of the secondary battery was similar to that in Example 1. The difference was in that during preparation of the negative electrode plate, the polyethylene films with single-side adhesion were replaced with a polyethylene terephthalate film with single-side adhesion and a polyvinyl chloride film with single-side adhesion, respectively.

Example 16

The preparation of the secondary battery was similar to that in Example 1. The difference was in that polytetrafluoroethylene was applied to the non-reaction zone of the negative electrode plate as a barrier layer, where the thickness was 20 μm.

Example 17

The preparation of the secondary battery was similar to that in Example 1. The difference was in that polymethyl methacrylate was applied to the non-reaction zone of the negative electrode plate as a barrier layer, where the thickness was 20 μm.

Example 18

The preparation of the secondary battery was similar to that in Example 1. The difference was in that during preparation of the negative electrode plate, a spacing zone was provided along the width direction of the negative electrode plate at the side of the lithium supplement layer on the negative electrode plate away from the reaction zone, where the spacing zone was formed by removing the negative electrode film layer through polishing and grinding, the spacing zone had a width of 15 mm and a depth equal to the thickness of the negative electrode film layer, namely 61 μm, and the barrier layer was provided starting from the spacing zone and extending away from the reaction zone.

Examples 19 and 20

The preparation of the secondary battery was similar to that in Example 18. The difference was in that the widths of the spacing zones were 5 mm and 50 mm, respectively.

Example 21

The preparation of the secondary battery was similar to that in Example 18. The difference was in that the depth of the spacing zone is 20 μm, meaning that the negative electrode film layer in the spacing zone was not entirely removed.

Comparative Example 1

The preparation of the secondary battery was similar to that in Example 1. The difference was in that during preparation of the negative electrode plate, no barrier layer was provided in the non-reaction zone.

Comparative Example 2

The preparation of the secondary battery was similar to that in Example 1. The difference was in that during preparation of the negative electrode plate, no lithium supplement layer was provided in the non-reaction zone and the barrier layer was provided in the entire non-reaction zone.

Comparative Example 3

The preparation of the secondary battery was similar to that in Example 1. The difference was in that during preparation of the negative electrode plate, no lithium supplement layer or barrier layer was provided in the non-reaction zone.

Performance Test for Secondary Battery

1. At 45° C., the battery was charged at 0.02 C for 10 h, and the capacity measured at that time was recorded as C0. At 25° C., the battery was charged at 0.33 C to 3.65 V and then charged to 0.05 C at a constant voltage of 3.65 V, and the capacity measured at that time was recorded as C1.

Finally, the battery was discharged to 2.5 V at 0.33 C, and the capacity measured at that time is recorded as DO. The first-cycle coulombic efficiency (initial coulombic efficiency) of the secondary battery was obtained according to $D0/(C0+C1)\times100\%$.

2. Storage Performance of Secondary Battery

At 45° C., the secondary battery was stored at 100% SOC (state of charge), and data was collected every 15 days for the first 60 days, and every 30 days after 60 days until the capacity decayed to 80%, and the number of storage days was recorded.

3. Cycling Performance of Secondary Battery

At 45° C., the secondary battery was charged to 3.65 V at 1 C, charged to 0.05 C at a constant voltage of 3.65 V, and discharged to 2.5 V at 1 C. The above steps were repeated for full charge and full discharge cycling testing until the capacity of the secondary battery decayed to 80% of the initial capacity, and the number of cycles was recorded.

The secondary batteries obtained in the above examples and comparative examples were tested according to the above process, respectively. The specific values are shown in Table 1.

TABLE 1

| | Lithium supplement layer | | | Barrier layer | | | | Battery performance | | |
|---|---|---|---|---|---|---|---|---|---|---|
| Example | Material | Distance from reaction zone (mm) | $C_{Li}/C_1 \times 100\%$ | Material | Thickness (μm) | Spacing zone Width (mm) | Spacing zone Depth (μm) | Initial coulombic efficiency (%) | Number of storage days at 80% capacity | Number of cycles at 80% capacity retention |
| Example 1 | Lithium foil | 3 | 100% | Polyethylene film | 20 | / | / | 92.4 | 498 | 2320 |
| Example 2 | Lithium aluminum alloy | 3 | 100% | Polyethylene film | 20 | / | / | 92.3 | 476 | 2249 |
| Example 3 | Lithium foil | 0 | 100% | Polyethylene film | 20 | / | / | 92.5 | 468 | 2240 |
| Example 4 | Lithium foil | 2 | 100% | Polyethylene film | 20 | / | / | 92.5 | 494 | 2327 |
| Example 5 | Lithium foil | 5 | 100% | Polyethylene film | 20 | / | / | 92.5 | 484 | 2304 |
| Example 6 | Lithium foil | 6 | 100% | Polyethylene film | 20 | / | / | 92.3 | 468 | 2283 |
| Example 7 | Lithium foil | 3 | 10% | Polyethylene film | 20 | / | / | 91.6 | 440 | 2229 |
| Example 8 | Lithium foil | 3 | 20% | Polyethylene film | 20 | / | / | 91.7 | 470 | 2280 |
| Example 9 | Lithium foil | 3 | 90% | Polyethylene film | 20 | / | / | 92.4 | 489 | 2303 |
| Example 10 | Lithium foil | 3 | 120% | Polyethylene film | 20 | / | / | 92.5 | 497 | 2326 |
| Example 11 | Lithium foil | 3 | 130% | Polyethylene film | 20 | / | / | 92.6 | 492 | 2279 |
| Example 12 | Lithium foil | 3 | 100% | Polyethylene film | 6 | / | / | 92.5 | 499 | 2324 |

TABLE 1-continued

| | Lithium supplement layer | | | Barrier layer | | Spacing zone | | Battery performance | | |
|---|---|---|---|---|---|---|---|---|---|---|
| Example | Material | Distance from reaction zone (mm) | $C_{Li}/C_1 \times 100\%$ | Material | Thickness (µm) | Width (mm) | Depth (µm) | Initial coulombic efficiency (%) | Number of storage days at 80% capacity | Number of cycles at 80% capacity retention |
| Example 13 | Lithium foil | 3 | 100% | Polyethylene film | 40 | / | / | 92.4 | 490 | 2301 |
| Example 14 | Lithium foil | 3 | 100% | Polyethylene terephthalate | 20 | / | / | 92.3 | 468 | 2282 |
| Example 15 | Lithium foil | 3 | 100% | Polyvinyl chloride film | 20 | / | / | 92.4 | 472 | 2290 |
| Example 16 | Lithium foil | 3 | 100% | Polytetrafluoroethylene | 20 | / | / | 92.3 | 469 | 2278 |
| Example 17 | Lithium foil | 3 | 100% | Polymethylmethacrylate | 20 | / | / | 92.4 | 466 | 2243 |
| Example 18 | Lithium foil | 3 | 100% | Polyethylene film | 20 | 15 | 61 | 92.5 | 520 | 2340 |
| Example 19 | Lithium foil | 3 | 100% | Polyethylene film | 20 | 5 | 61 | 92.6 | 518 | 2344 |
| Example 20 | Lithium foil | 3 | 100% | Polyethylene film | 20 | 50 | 61 | 92.5 | 510 | 2335 |
| Example 21 | Lithium foil | 3 | 100% | Polyethylene film | 20 | 15 | 20 | 92.4 | 497 | 2320 |
| Comparative Example 1 | Lithium foil | 3 | 100% | / | / | / | / | 92.2 | 450 | 2221 |
| Comparative Example 2 | / | / | / | Polyethylene film | 20 | / | / | 91.5 | 437 | 2206 |
| Comparative Example 3 | / | / | / | / | / | / | / | 91.1 | 368 | 2028 |

According to Table 1, the secondary batteries of all the above examples outperform the secondary batteries of the comparative examples in terms of cycles at 80% capacity retention.

According to comparison between Example 1 and Comparative Examples 1 to 3, providing a lithium supplement layer and a barrier layer in the non-reaction zone of the negative electrode plate can significantly improve the initial coulombic efficiency, storage performance, and cycling performance of the secondary batteries.

According to comprehensive comparison between Example 1 and Examples 3 to 6, when the distance between the side of the lithium supplement layer closer to the reaction zone and the reaction zone is 2 mm to 5 mm, the initial coulombic efficiency, number of days of storage at 80% capacity, and number of cycles at 80% capacity retention of the secondary batteries can be further improved. The secondary battery exhibits good initial coulombic efficiency when the distance between the side of the lithium supplement layer closer to the reaction zone and the reaction zone is 0 mm. However, if the side of the lithium supplement layer closer to the reaction zone is directly attached to the edge of the reaction zone, lithium precipitation may occur at the reaction zone, thus affecting safety of the battery cell.

Therefore, the distance between the side of the lithium supplement layer closer to the reaction zone and the reaction zone is greater than 0 mm.

According to comprehensive comparison between Example 1 and Examples 7 to 11, when the theoretical capacity of lithium $C_{Li}$ in the lithium supplement layer and the capacity $C_1$ of the corresponding negative electrode film layer of the lithium supplement layer satisfy 20% $C_1 \leq C_{Li} \leq 120\%$ $C_1$, the initial coulombic efficiency, storage performance, and cycling performance of the secondary batteries can be further improved. Although the secondary battery exhibits good initial coulombic efficiency, storage performance, and cycling performance when $C_{Li} = 130\%$ $C_1$, if $C_{Li} > 120\%$ $C_1$, local lithium precipitation may occur in the reaction zone of the negative electrode. Therefore, it is necessary to ensure that $C_{Li} \leq 120\%$ $C_1$.

According to comprehensive comparison between Example 1 and Examples 18 to 21, when the spacing zone is provided at the side of the lithium supplement layer away from the reaction zone on the negative electrode plate, the initial coulombic efficiency, storage performance, and cycling performance of the secondary battery can be further improved.

According to comprehensive comparison between Example 18 and Example 21, when the depth of the spacing zone is equal to the thickness of the negative electrode film layer, the initial coulombic efficiency, storage performance, and cycling performance of the secondary battery can be further improved.

It should be noted that this application is not limited to the foregoing embodiments. The foregoing embodiments are merely examples, and embodiments having substantially the same constructions and the same effects as the technical idea within the scope of the technical solutions of this application are all included in the technical scope of this application. In addition, without departing from the essence of this application, various modifications made to the embodiments that can be conceived by persons skilled in the art, and other manners constructed by combining some of the constituent elements in the embodiments are also included in the scope of this application.

The invention claimed is:

1. A secondary battery, comprising a positive electrode plate and a negative electrode plate, wherein the positive electrode plate comprises a positive electrode current collector and a positive electrode film layer provided on two surfaces of the positive electrode current collector, the negative electrode plate comprises a negative electrode current collector and a negative electrode film layer provided on two surfaces of the negative electrode current collector, and the negative electrode film layer comprises a reaction zone opposite the positive electrode film layer and a non-reaction zone not opposite the positive electrode film layer, wherein a lithium supplement layer and a barrier layer are provided on the non-reaction zone, the lithium supplement layer is provided at an end of the non-reaction zone closer to the reaction zone, and the barrier layer is provided starting from the lithium supplement layer and extending away from the reaction zone.

2. The secondary battery according to claim 1, wherein distance between a side of the lithium supplement layer closer to the reaction zone and the reaction zone is 2 mm to 5 mm.

3. The secondary battery according to claim 1, wherein the lithium supplement layer comprises a substance capable of providing active lithium.

4. The secondary battery according to claim 1, wherein a theoretical capacity of lithium in the lithium supplement layer, $C_{Li}$, satisfies 20% $C_1 \leq C_{Li} \leq 120\%$ $C_1$, where $C_1$ is the capacity of the negative electrode film layer corresponding to the lithium supplement layer.

5. The secondary battery according to claim 1, wherein the barrier layer is selected from a film or coating incapable of being infiltrated by electrolyte; the film comprises one or more of polypropylene, polyethylene, polyester fiber, and polyvinyl chloride, the coating comprises one or more of polyvinylidene fluoride, polytetrafluoroethylene, polyamide, polyimide, polymethyl methacrylate, polyurethane, polystyrene, polyacrylic acid, polyacrylamide, polyacrylonitrile, and a copolymer thereof.

6. The secondary battery according to claim 5, wherein the film is adhesive and has an adhesion of greater than 20 N/m.

7. The secondary battery according to claim 1, wherein thickness of the barrier layer is 6 μm to 40 μm.

8. The secondary battery according to claim 1, wherein a spacing zone is provided along a width direction of the negative electrode plate at a side of the lithium supplement layer on the negative electrode plate away from the reaction zone, and the barrier layer is provided starting from the spacing zone and extending away from the reaction zone.

9. The secondary battery according to claim 8, wherein width of the spacing zone is 5 mm to 50 mm.

10. The secondary battery according to claim 8, wherein depth of the spacing zone is equal to thickness of the negative electrode film layer.

11. A battery module, comprising the secondary battery according to claim 1.

12. A battery pack, comprising the battery module according to claim 11.

13. An electric apparatus, comprising the secondary battery according to claim 1.

14. A preparation method of secondary battery, comprising the following:

(1) preparing a positive electrode plate;

(2) preparing a negative electrode plate;

(3) preparing a separator;

(4) preparing an electrolyte; and (5) preparing a secondary battery;

wherein step (2) comprises a step of providing a lithium supplement layer and a barrier layer on the negative electrode plate; and the secondary battery comprises a positive electrode plate and a negative electrode plate, wherein the positive electrode plate comprises a positive electrode current collector and a positive electrode film layer provided on two surfaces of the positive electrode current collector, the negative electrode plate comprises a negative electrode current collector and a negative electrode film layer provided on two surfaces of the negative electrode current collector, and the negative electrode film layer comprises a reaction zone opposite the positive electrode film layer and a non-reaction zone not opposite the positive electrode film layer, wherein a lithium supplement layer and a barrier layer are provided on the non-reaction zone, the lithium supplement layer is provided at an end of the non-reaction zone closer to the reaction zone, and the barrier layer is provided starting from the lithium supplement layer and extending away from the reaction zone.

15. The method according to claim 14, wherein the barrier layer is provided through a coating or adhesive process.

\* \* \* \* \*